(12) United States Patent
Salvatori et al.

(10) Patent No.: US 6,935,754 B2
(45) Date of Patent: Aug. 30, 2005

(54) USER-INTERFACE FOR A PROJECTION DEVICE

(75) Inventors: Phillip H. Salvatori, Salem, OR (US); R. David Woolf, Portland, OR (US)

(73) Assignee: In Focus Corporation, Wilsonville, OR (US)

( * ) Notice: Subject to any disclaimer, the term of this patent is extended or adjusted under 35 U.S.C. 154(b) by 8 days.

(21) Appl. No.: 10/438,612

(22) Filed: May 14, 2003

(65) Prior Publication Data

US 2005/0002000 A1 Jan. 6, 2005

(51) Int. Cl.[7] .......................... G03B 21/14; G03B 21/22; G03B 21/26; G03B 21/00
(52) U.S. Cl. ........................... 353/119; 353/30; 353/121
(58) Field of Search ............................... 353/119, 30–31, 353/36, 62–63, 121; 345/5, 87, 705, 708–711, 716, 730, 721–722; 348/14.07

(56) References Cited

U.S. PATENT DOCUMENTS

| | | | |
|---|---|---|---|
| 4,431,282 A | 2/1984 | Böser | 353/20 |
| 5,461,437 A | * 10/1995 | Tanaka et al. | 353/71 |
| 5,526,011 A | 6/1996 | Hix et al. | 345/87 |
| 5,767,897 A | 6/1998 | Howell | 348/14.07 |
| 5,859,623 A | 1/1999 | Meyn et al. | 345/730 |
| 5,944,404 A | 8/1999 | Pagano et al. | 353/105 |
| 5,990,931 A | 11/1999 | Nimri et al. | 348/14.08 |
| 6,196,687 B1 | * 3/2001 | Smith | 353/31 |
| 6,481,855 B2 | * 11/2002 | Oehler | 353/70 |
| 6,511,187 B1 | * 1/2003 | Salerno et al. | 353/121 |
| 6,626,543 B2 | * 9/2003 | Derryberry | 353/119 |
| 6,735,616 B1 | * 5/2004 | Thompson et al. | 709/204 |
| 2002/0036694 A1 | * 3/2002 | Merril | 348/220 |

* cited by examiner

*Primary Examiner*—Rodney Fuller
*Assistant Examiner*—Magda Cruz
(74) *Attorney, Agent, or Firm*—Alleman Hall McCoy Russell & Tuttle LLP

(57) ABSTRACT

The present invention provides a projector assembly including a projection device adapted to project an image, and a user-interface in communication with the projection device. The user-interface may be adapted to privately present user-readable information to a user.

19 Claims, 2 Drawing Sheets

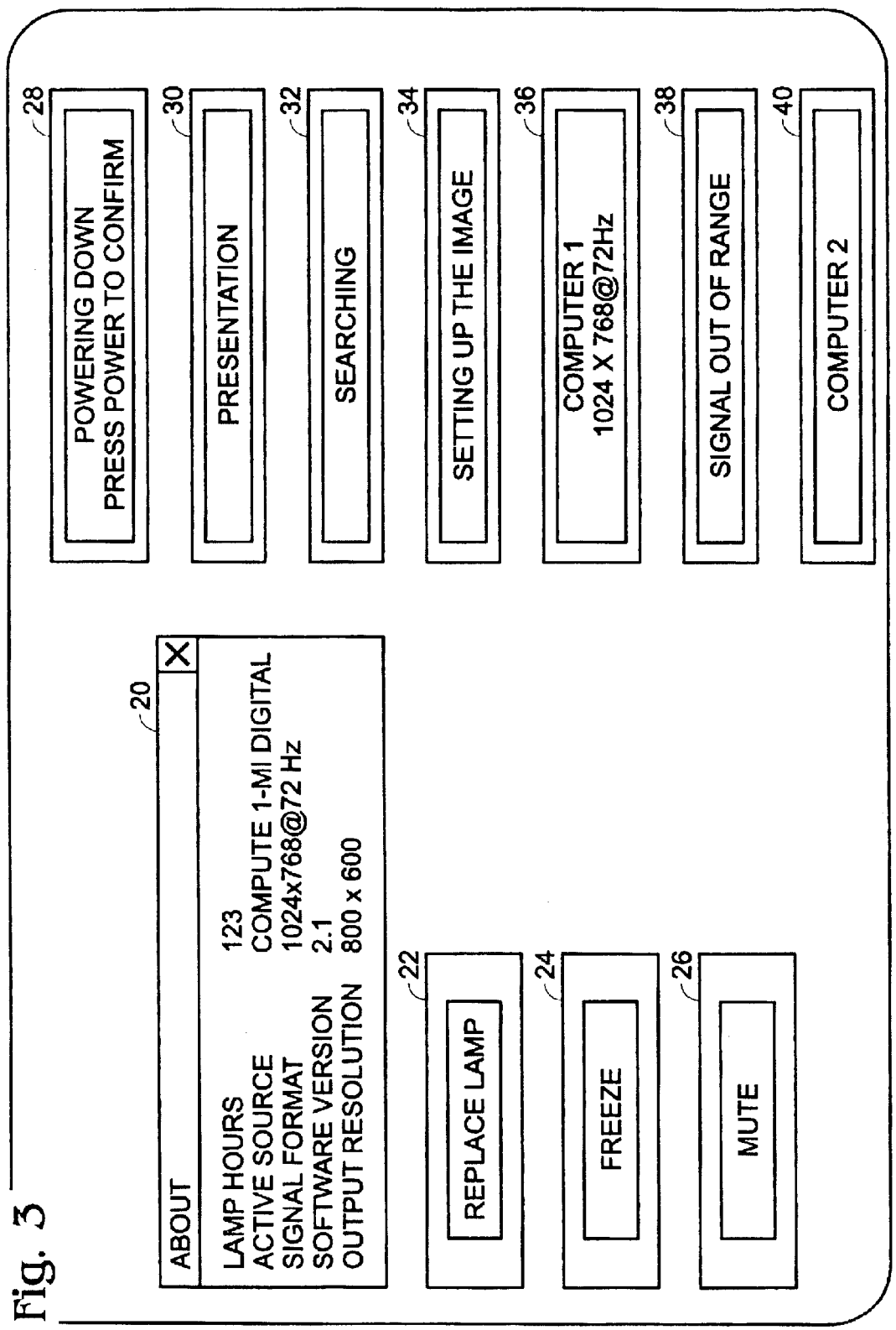

USER-INTERFACE FOR A PROJECTION DEVICE

TECHNICAL FIELD

The present invention relates to projection devices. More specifically, the present invention relates to methods and apparatus for accessing projector status information.

BACKGROUND

Projectors are widely used to enable effective presentation of images to an audience. However, using a projector can be frustrating, as users typically have to project an image in order to obtain status information about the projector. This configuration may require a user to interrupt or delay a presentation in order to trouble-shoot a problem, change the projector's settings, or ascertain the current settings. It would be desirable to have a projector that allows a user to privately access projector status information without having to project an image or interrupt a presentation.

SUMMARY

In a first embodiment, the present invention provides a projector assembly including a projection device adapted to project an image and a user-interface in communication with the projection device. Typically, the user-interface is adapted to privately present projection device status information to a user.

In another embodiment, the present invention provides a projector assembly including a projection device, a user-interface and a controller. The user-interface may be disposed on the body of the projector and adapted to display information regarding operation of the projector. The controller may be adapted to allow a user to manage the information displayed on the user-interface.

BRIEF DESCRIPTION OF THE DRAWINGS

FIGS. 2–5 depict exemplary information according to embodiments of the present invention that might be displayed on the user-interface shown in FIG. 1.

DETAILED DESCRIPTION

Figure 1:
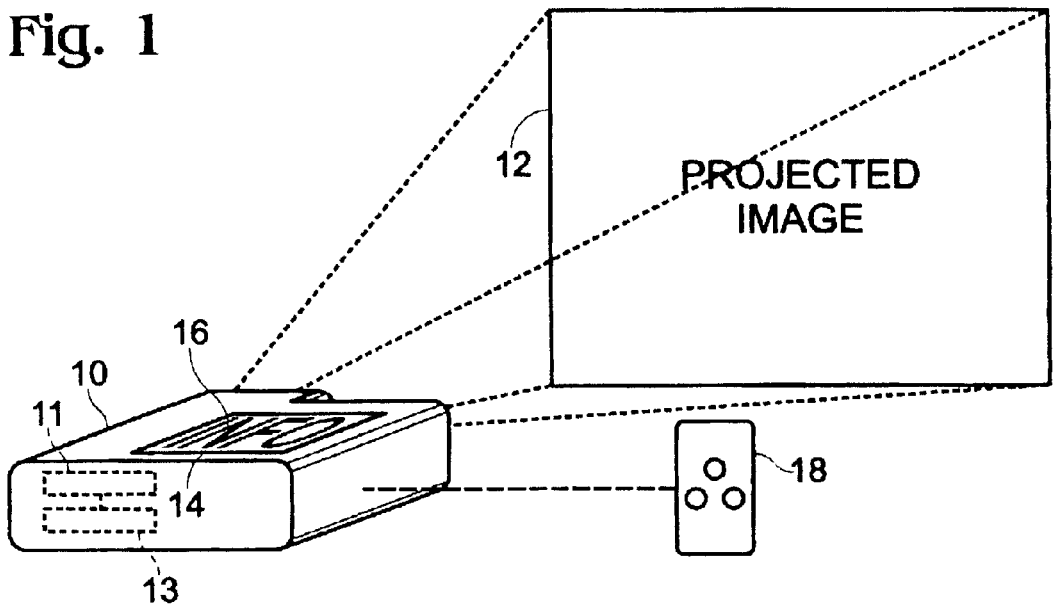
FIG. 1 is a schematic illustration of an exemplary projector assembly according to an embodiment of the present invention.

FIG. 1 depicts an exemplary embodiment of the present invention. As shown, a projection device 10 is adapted to project a presentation image 12. Presentation image 12 may be projected onto any suitable display surface, including, but not limited to, a screen, a wall, or other viewing surface or area.

Projection device 10 may be a projector or image-generating device that is able to project an image onto a display surface. As used herein, a projection device or image-generating device may include any suitable display device or image projector, including, but not limited to, a digital projector, a liquid crystal display (LCD) projector, a digital light processing projector, etc.

Projection device 10, in its most basic form, includes a processor 11 and memory 13. Although shown as resident on the projection device, it should be appreciated that the processor and memory described above may be resident on a linked computing device, such as a computer, portable computer, portable data assistant, server, camera, control unit, etc.

Processor 11 may take the form of a central processing unit (CPU), or other suitable controller for controlling operation of the projection device. Processor 11 thus may be configured to manage operation and function of the projection device. For example, processor 11 may manage operational programs, menu programs, user-interface programs, etc.

Memory 13 may include both volatile memory and non-volatile memory. Non-volatile memory may be utilized to store permanent or semi-permanent data. Such non-volatile memory may be any suitable type of non-volatile memory, including, but not limited to, ROM, PROM, EPROM, EEPROM and Flash memory, and combinations thereof. Volatile memory may be utilized to store temporary data, including images and instructions. Volatile memory may include one or more suitable types of volatile memory, such as SRAM or DRAM.

As described in more detail below, memory 13 of projection device 10 may be configured to store any of the information and menus described herein. Processor 11 may be configured to operate the projection device such that a user-interface 14 (described in more detail herein) displays user-readable information 16 to a user.

User-interface 14 may be configured to provide a private (non-projected) display to a user. Various types of display information 16 may be displayed on the user-interface. The user-interface may be disposed on the body of the projection device. For example, the user-interface may be located on the top of the projection device, as shown in FIG. 1. Alternatively, the user-interface may be located at the back or on a side of the projection device. When the user-interface is disposed on the body of the projection device, it may be referred to as an "on-board" user-interface.

FIG. 1 shows an exemplary on-board user interface disposed on a top surface of the projection device. The on-board user interface is integrated into the projection device and is shown substantially coplanar with the top surface of the projection device. During operation of the projection device, a user may view the user-interface while projecting an image from the projection device.

As a further alternative, the user-interface may be located remotely from the body of the projection device and be in electronic communication with the projection device via wired or wireless technology. For example, it should be appreciated that the user-interface may be disposed on a remote device such as remote controller. Moreover, the user-interface may take the form of, or be similar to, a compact computing device such as a laptop computer or Personal Data Assistant (PDA) that can communicate with the projection device via an attached cord, through Bluetooth™ wireless technology, via a modem, or in some other manner.

Moreover, a projection device may include more than one user-interface. For example, in some embodiments, it may be desirable to include a first user-interface disposed on the body of the projection device and a second remote user-interface that communicates with the projection device through Bluetooth™ wireless technology. The remote user-interface may be located, for example, on a remote controller, or other remote device User-interface 14 may include a display screen adapted to display user-readable information 16. The information 16 presented by user-interface 14 may take the form of text, graphic, and/or video images. In some cases, the user-interface may be capable of presenting pixelated images. The user-interface may be a Liquid Crystal Display (LCD) or any other suitable display.

User-interface 14 may be of any suitable size. For example, user-interface 14 may be a display adapted to display a single line of text. Alternatively, in other embodiments, user-interface 14 may be adapted to display graphical images, menus, and multi-line images.

A controller 18 may be linked with projection device 10. In some embodiments, controller 18 may be configured to allow a user to manage information displayed on user-interface 14. For example, and not as a limitation, a user may use controller 18 to turn the projection device off, in response to the user's selection, information regarding powering down the projection device may be displayed on the user-interface.

As stated above, user-interface 14 is adapted to display user-readable information regarding projection device 10. As non-limiting examples, the user-readable information may include set-up information and/or instructions, troubleshooting information and/or instructions, status information, etc. Information related to operation of the projection device may be displayed on user-interface 14. In some embodiments, the user-interface may be a passive display.

In some embodiments, user-interface 14 may be an interactive display. For example, in some embodiments, a user may select and control the information displayed on user-interface 14. In some cases, it may be desirable to present some or all of the information in the form of a navigable menu 19, such as the exemplary menu shown in FIG. 2. A suitable method of menu presentation is described in co-pending U.S. patent application Ser. No. 10/439,008 filed May 14, 2003, of Phillip H. Salvatori et al., entitled Method for Menu Navigation, which is hereby incorporated by reference in its entirety for all purposes.

Figure 2:
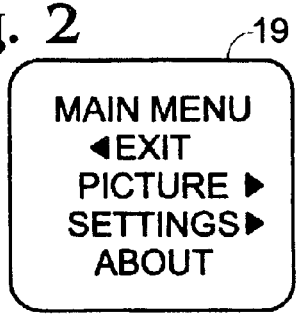

The exemplary menu, shown in FIG. 2, may link with menus and selection boxes, which enable a user to change and alter settings. Such menus and selection boxes may be displayed on the user interface.

As described above, user interface 14 may display set-up information. Set-up information may include information and/or instructions describing how to set up the projection device and/or how to project images using the projection device. The set-up information may enable a user to view, select, and/or alter current settings for the projection device. For example, a given projection device may be capable of projecting images from multiple sources such as from a computer, Videocassette Recorder (VCR) or Digital Versatile Disc (DVD). As such, a user may desire to access and alter the settings depending on the current linked source in order to optimize viewing of the image.

In some embodiments, user-interface 14 may be an interactive display. For example, in some embodiments, a user may select and control the information displayed on user-interface 14. In some cases, it may be desirable to present some or all of the information in the form of a navigable menu 19, such as the exemplary menu shown in FIG. 2. A suitable method of menu presentation is described in co-pending U.S. patent application Ser. No. 10/439,008 filed May 14, 2003, of Phillip H. Salvatori et al., entitled Method for Menu Navigation, which is hereby incorporated by reference in its entirety for all purposes.

As mentioned above, user interface 14 further may present status information. Status information may include information and/or instructions regarding the current activity in which the projection device is engaged. Status information may further include, but is not limited to, information regarding a response to a user command, the current settings for the projection device, which accessories are attached or otherwise in communication with the projection device, whether any of the parts or accessories require maintenance and/or replacement, etc. For example, user-interface 14 may display text and/or graphics indicating that the lamp in the projection device needs replacement.

As examples, and not as limitations, user-interface 14 may be adapted to display one or more dialog boxes (or dialogs) under various conditions. Without wishing to be limited, exemplary dialog boxes are shown in FIG. 3 and described below. Each of these boxes, or other such dialogs, may be displayed on user interface 14. It should be appreciated that other types dialog boxes, other than those described, may be displayed without departing from the scope of the invention. Thus, although an "About" dialog box 20, a "Replace Lamp" dialog box 22, a "Freeze" dialog box 24, a "Mute" dialog box 26, a "Powering Down" dialog box 28, etc. are described in detail, it should be appreciated that other types of dialog boxes are possible and contemplated.

To aid in understanding the present invention, an "About" dialog box 20 may include information about the projection device. For example, the About dialog box may include information, such as the number of lamp hours used, the active source, the signal format, the software version, the output resolution, etc. This dialog box may appear on user interface 14 when the user chooses to view the "About" information and may be accessed independently or through a menu system displayed on the user interface.

Similarly, a user may be able to access and view a "Replace Lamp" dialog box 22 through user-interface 14. In some embodiments, a "Replace Lamp" dialog box 22 may appear during the power-up stage when the lamp has reached its replacement age and during any subsequent power-ups until the lamp is replaced. Typically, the "Replace Lamp" dialog box may appear for a given period of time, such as one minute. It should be appreciated that some dialog boxes may be set up such that they are difficult for a user to bypass. For example, the "Replace Lamp" dialog box may appear on the user-interface for a predetermined period of time and may be difficult for a user to bypass.

Other exemplary dialog boxes include a "Freeze" dialog box 24, which may appear when the projected image is frozen. Moreover, in some embodiments, a "Mute" dialog box 26 may appear the audio is muted. Similarly, in other embodiments, a "Powering Down. Press Power to Confirm." dialog box 28 may appear when the user selectively to turns the projection device off. Furthermore, a "Presentation" dialog box 30 may appear when the user presses a specific button, such as the "preset" button described In co-pending U.S. patent application Ser. No. 10/438,630, filed May 14, 2003, of Phillip H. Salvatori et al., entitled Preset Key for a Projection Device, hereby incorporated by reference for all purposes.

Further exemplary dialog boxes include a "Searching . . . " dialog box 32, may appear during operation of the projection device. For example, the "Searching . . . " dialog box may appear when the projection device is trying to find an input signal. Moreover, a "Setting Up the Image" dialog box 34 may appear when the projection device is trying to lock onto an input signal. A Confirmation dialog box 36, indicating the signal source, such as "Computer 1 1024×768@72 Hz" may appear when the projection device locks onto an input signal. As a further example, a "Signal Out of Range" dialog box 38 may appear when the projection device is unable to lock onto a valid input signal. Likewise, a Confirmation dialog box 40 such as "Computer 2" may appear when the user selects or otherwise changes the input source.

Figure 4:
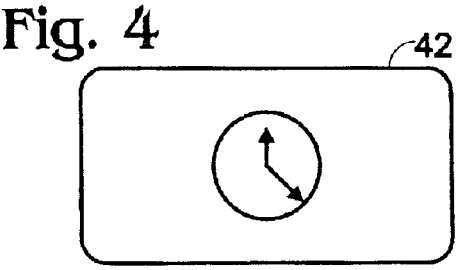

Alternatively, or additionally, user-interface 14 may include a timer 42, as shown in FIG. 4. For example, timer 42 may be adapted to present a countdown display. The countdown display may be intended to indicate when the projection device will be on-line, when the next image will appear, when input is expected from the user, time to shut down, power-up period, etc. As will be appreciated, the timer may be a graphical display, a numerical display and may be displayed in analog, digitized, or any other suitable user-interpretable format.

Figure 5:
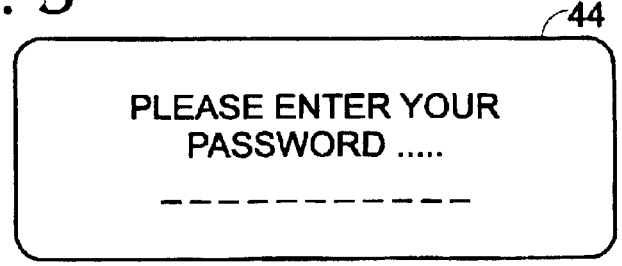

As a further addition or alternative, user-interface 14 may present the user with an opportunity to enter a password, as shown in dialog box 44 in FIG. 5. Password entry may provide access to the projection device itself, projection device sources, or to specific functions of the projection device.

It will be appreciated that any information including the dialogs described above may be presented to the user via the user-interface without projecting an image. Thus, by viewing the user-interface, the presenter may privately view a dialog, image, or message. Privately, as used herein, includes displaying an image viewable by a user on a user-interface of a projection device, without requiring projection of the image on a display surface. However, it should be understood that, in some embodiments, images viewed via the user-interface may be projected as a presentation image by the projection device, should it be desirable to do so.

As stated above, user-interface 14 may be capable of displaying an image or text that is, has been, or will be projected by projection device 10. For example, user-interface 14 may display a preview of the next image to be shown during a presentation, before it is projected. Furthermore, user-interface 14 may enable the presenter to alter the projection device's settings with regard to the next image so as to optimize presentation of the particular image, before the image is projected.

As briefly described above, controller 18 may be linked to the projection device. Controller 18 may be located on the body of the projection device or remotely, i.e. in a remote control. Thus, controller 18 may be integrated with the other controls for the projection device or may be separate. For example, controller 18 may be one or more buttons or other user-inputs located on the body of the projection device.

Typically, controller 18 enables a user to manage the information displayed on the user-interface. For example, controller 18 may allow a user to scroll through various menus, select options, change settings, or otherwise interact with the user-interface. Thus, as an illustrative example, a user may be requested via the user-interface for a password code. The request may be in the form of a dialog box displayed privately to the user via the user-interface. The user may operate controller 18 to input a password code, thus, providing access to the projection device.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein.

The following claims particularly point out certain combinations and subcombinations regarded as novel and nonobvious and directed to one of the inventions. These claims may refer to "an" element or "a first" element or the equivalent thereof; such claims should be understood to include incorporation of one or more such elements, neither requiring nor excluding two or more such elements. Inventions embodied in other combinations and subcombinations of features, functions, elements, and/or properties may be claimed through amendment of the present claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

What is claimed is:

1. A projector assembly comprising:

a projection device configured to project a projected image; and a user-interface integrated into the projection device, wherein the user-interface is disposed on a top surface of a body of the projection device and is configured to privately present user-readable projection device operation information to a user, such that the projection device operation information is not displayed in the projected image;

wherein the projection device operation information is selected from the group consisting of projection device set-up instructions, projection device status information, and projection device maintenance information.

2. The projector assembly of claim 1, wherein the user-interface comprises a Liquid Crystal Display (LCD).

3. The projector assembly of claim 1, wherein the projection device operation information is projection device status information selected from the group consisting of active source information, signal format information, software version information, output resolution information, when the projection device will be on-line, when a next image will appear, when input is expected from a user, time to shutdown, and time to power up.

4. The projector assembly of claim 1, wherein the projection device operation information is projection device maintenance information selected from the group consisting of replace lamp message and number of lamp hours used.

5. A method for providing access to information regarding operation of a projection device, the method comprising:

displaying a projected image via the projection device;

concurrent with displaying the projected image, displaying status information regarding the projection device on a user interface, wherein the user interface includes a display that is disposed on a top surface of the body of the projection device to enable a user to view the display when looking down on the projection device from above; and providing a controller adapted to allow the user to manage the displayed information;

wherein the status information is not displayed in the projected image.

6. The method of claim 5, wherein the controller is further adapted to allow a user to alter at least some settings on the projection device.

7. The method of claim 5, wherein the step of displaying status information on a user interface is independent of display of a projected image.

8. The projector assembly of claim 5, wherein the status information is selected from the group consisting of active source information, signal format information, software version information, output resolution information, when the projection device will be on-line, when a next image will appear, when input is expected from a user, time to shut down, and time to power up.

9. A projection device comprising:
an image display device configured to project a projected image, the image display device being housed in a body having a top surface; and
an on-board display screen integrated into the top surface and configured to be viewed from above, the display screen configured to display to a user a dialog with projection device operation information, the projection device operation information relating to the projection of images from the projection device;
wherein the dialog is not presented in the projected image.

10. The projection device of claim 9, wherein the dialog includes projection device set-up instructions.

11. The projection device of claim 9, wherein the on-board display screen is a Liquid Crystal Display (LCD).

12. The projection device of claim 9, wherein the dialog includes projection device maintenance information.

13. The projection device of claim 12, wherein the projection device maintenance information is a replace lamp message.

14. The projection device of claim 9, wherein the dialog includes projection device status information.

15. The projection device of claim 14, wherein the projection device status information includes one of number of lamp hours used, active source information, signal format information, software version information, and output resolution information.

16. The projection device of claim 9, wherein the dialog includes a timer configured to display an indication of one of the following: when the projection device will be on-line, when a next image will appear, when input is expected from a user, time to shut down, and time to power up.

17. The projection device of claim 9, wherein the dialog includes a dialog box configured to receive a password.

18. The projection device of claim 9, wherein the dialog includes information that is related to trouble-shooting the projection device.

19. The projection device of claim 9, wherein the dialog includes a single line of text.

* * * * *

UNITED STATES PATENT AND TRADEMARK OFFICE
CERTIFICATE OF CORRECTION

PATENT NO. : 6,935,754 B2
APPLICATION NO. : 10/438612
DATED : August 30, 2005
INVENTOR(S) : Phillip H. Salvatori and R. David Woolf It is certified that error appears in the above-identified patent and that said Letters Patent is hereby corrected as shown below:

Title Page, in Item (73):

On Line 1, delete "In Focus Corporation" and insert --InFocus Corporation-- therefor.

Signed and Sealed this

Eighth Day of December, 2009

David J. Kappos
*Director of the United States Patent and Trademark Office*